United States Patent [19]

Osanai

[11] Patent Number: 4,460,932

[45] Date of Patent: Jul. 17, 1984

[54] A METHOD FOR SETTING HEADS OF A CASSETTE TAPE RECORDER AND A MECHANISM FOR ITS PRACTICE

[75] Inventor: Akira Osanai, Tokyo, Japan

[73] Assignee: Olympus Optical Co., Ltd., Tokyo, Japan

[21] Appl. No.: 328,469

[22] Filed: Dec. 8, 1981

[30] Foreign Application Priority Data

Dec. 15, 1980 [JP] Japan .................................. 55-176876

[51] Int. Cl.³ ........................ G11B 5/54; G11B 21/02
[52] U.S. Cl. ................................... 360/105; 360/74.1; 360/130.32
[58] Field of Search .............. 360/105, 104, 96.1–96.2, 360/96.4, 130.21, 130.32, 74.1, 74.2

[56] References Cited

U.S. PATENT DOCUMENTS 4,283,746  8/1981  Pera ..................................... 360/96.4
4,305,103 12/1981  Osanai ................................. 360/105
4,309,733  1/1982  Tomabechi ........................ 360/96.1

Primary Examiner—John H. Wolff
Attorney, Agent, or Firm—Frishauf, Holtz, Goodman & Woodward

[57] ABSTRACT

A method for setting magnetic head of a cassette tape recorder includes biasing a head lever and a pinch roller lever to move in a direction toward a tape of a tape cassette, and interrupting the movement of the head lever and the pinch roller lever by stop member until the tape cassette is loaded. The stop member is removed from the path of movement of the head lever and the pinch roller lever by pressing the stop member with the tape cassette or a cassette holder when the tape cassette is inserted in the cassette holder, and the cassette holder is moved to bring the tape cassette to an operating position.

7 Claims, 11 Drawing Figures

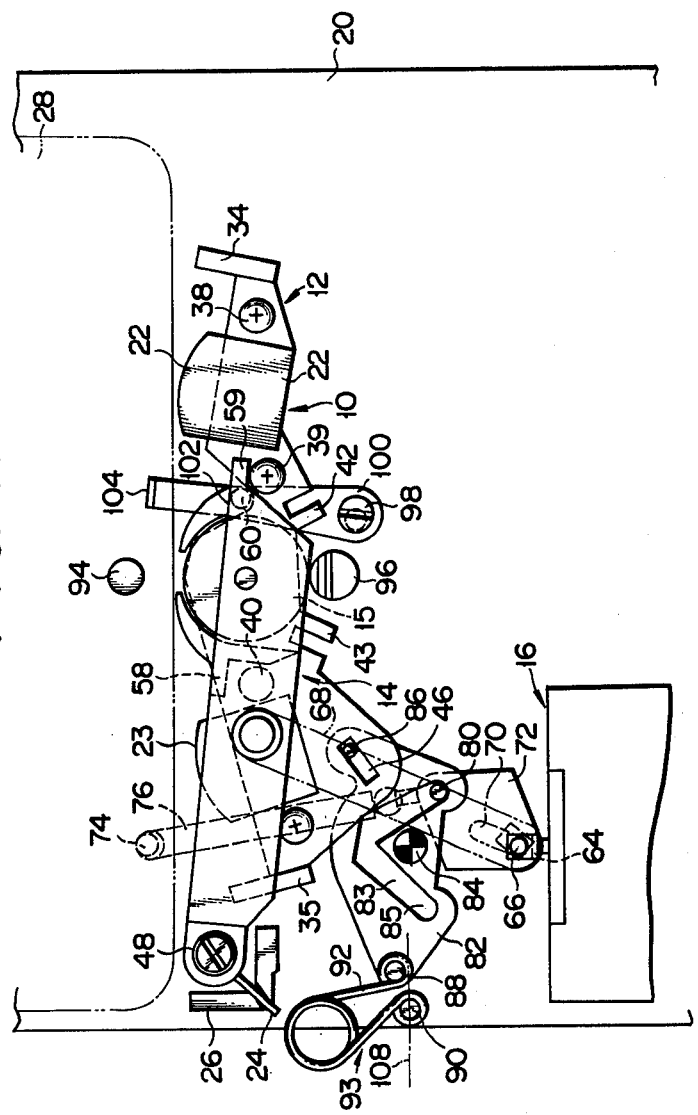

METHOD FOR SETTING HEADS OF A CASSETTE TAPE RECORDER AND A MECHANISM FOR ITS PRACTICE

BACKGROUND OF THE INVENTION

The present invention relates to a method for setting any one of the heads of a cassette tape recorder, and a head selection or setting mechanism for its practice.

After a tape cassette is inserted in a cassette tape recorder, the reproduction mode and recording mode are set by sliding or pivoting an operation button, for example, so that a head lever and a pinch roller lever move in the direction of tape travel. In such a known method and arrangement, a force which is applied to the operation button is used for sliding or pivoting the head lever and the pinch roller lever. For this purpose, a considerably large force must be applied to slide or pivot the head lever and the pinch roller lever. In order to eliminate the above problem, a method and a mechanism for its practice have been proposed in which a touch switch is used instead of the mechanically operated operation button in order to operate a motor. The rotating force of the motor is used to move the head lever and the pinch roller lever. With such arrangement which uses a motor, a large force is not required to move the head lever and the pinch roller lever as compared with the conventional operation button which operates mechanically, so that recording and reproduction may easily be performed. However, a reduction gear mechanism and cams are required for this purpose, resulting in complex structure of the head selection mechanism. Further, in the known cassette tape recorder, an operation is required in which the head lever and the pinch roller lever must be moved in the direction of tape travel with an operation button or a touch button after the tape cassette is inserted in the cassette tape recorder, in addition to the operation of inserting the tape cassette in the cassette tape recorder. In this manner, operations of inserting the tape cassette in the cassette tape recorder and of depressing the operation button or the touch button are required, thus preventing quick recording and reproduction operations.

SUMMARY OF THE INVENTION

It is therefore an object of the present invention to eliminate the drawbacks of the conventional cassette tape recorder and to provide a method for setting any one of the heads of a cassette tape recorder, and a head setting mechanism for its practice.

In order to achieve the above and other objects of the present invention, there is provided a cassette tape recorder according to a method for setting any one of the heads of the present invention, in which a biasing force is imposed to move a head lever and a pinch roller lever in the direction of tape travel. The pivotal movement of the head lever and the pinch roller lever is prohibited when they are in contact with a stopper. When a tape cassette is inserted in the cassette tape recorder, the stopper is pressed and displaced by the tape cassette so that the head lever and the pinch roller lever are free to move.

The above and further objects and novel features of the present invention will more fully appear from the following detailed description when the same is read in connection with the accompanying drawing. It is to be expressly understood, however, that the drawing is for the purpose of illustration only and is not intended as a definition of the limits of the present invention.

BRIEF DESCRIPTION OF THE DRAWING

FIGS. 2 to 8 show component parts of the head setting mechanism, in which FIG. 2 is a plan view of a head lever, FIGS. 3 and 4 are a plan view and a front view of a pinch roller lever, respectively, FIG. 5 is a plan view of a rhombic segment, FIGS. 6 and 7 are a plan view and a front view of a leaf spring, respectively, and FIG. 8 is a plan view of a modification of the leaf spring of FIG. 7;

FIGS. 10 and 11 are schematic plan views of the head setting mechanism in which the head lever and the pinch roller lever are located in the neutral position.

DETAILED DESCRIPTION OF THE PREFERRED EMBODIMENT

Figure 1:
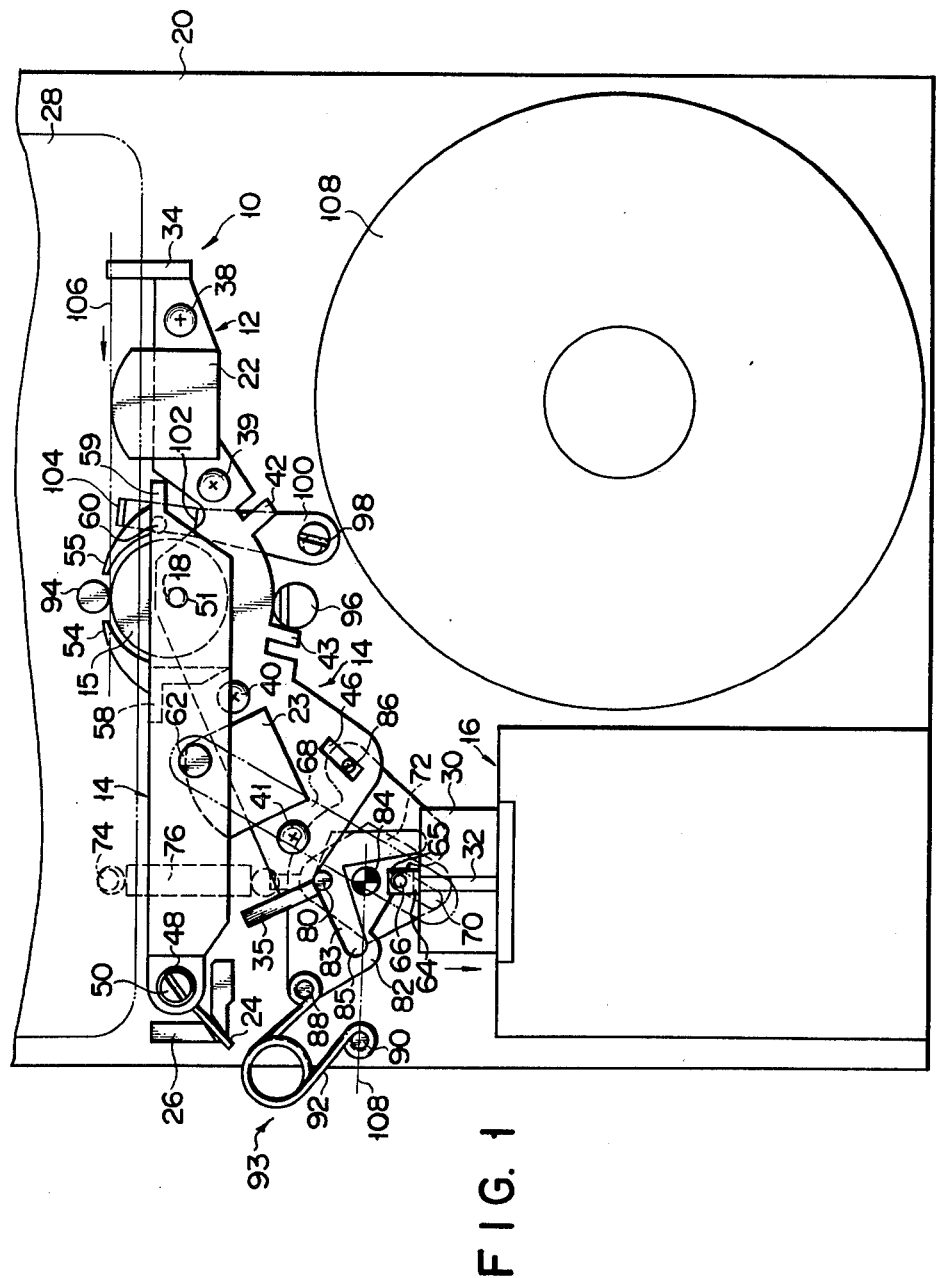
FIG. 1 is a schematic plan view of a head setting mechanism of a cassette tape recorder of the automatic reverse type in the forward play mode, according to the present invention.

Referring to FIG. 1, a head setting mechanism 10 of a cassette tape recorder of the automatic reverse type comprises a head lever 12, a pinch roller lever 14 and a solenoid 16. The head lever 12 is pivotally mounted on a base plate 20 by a rotation pin 18. A pair of magnetic heads 22 and 23 are disposed on the head lever 12. The pinch roller lever 14 is located above the head lever 12. The pinch roller lever 14 includes a pinch roller 15 and is pivotally mounted to an upright post 48 on the base plate 20. A torsion spring 24 is wound around the upright post 48 and one end of the torsion spring 24 engages with an upright wall 26 on the base plate 20 so that the torsion spring 24 biases the pinch roller lever 14 in the counterclockwise direction around the upright post 48. The solenoid 16 includes a plunger 30 which is free to move inside the solenoid 16. A rotation-preventing, elongated groove 32 is formed on the upper surface of the plunger 30. The plunger 30 is drivingly and separately connected to the head lever 12 and the pinch roller lever 14. When the solenoid 16 is excited to retract the plunger 30 into the solenoid 16, a mode selection from the play mode to the FF.REW modes, a head setting, in the automatic reverse mode or the manual mode, or a lever setting to move the head lever 12 and the pinch roller lever 14 to the neutral position in the cassette eject mode, can be performed as needed.

Figure 2:
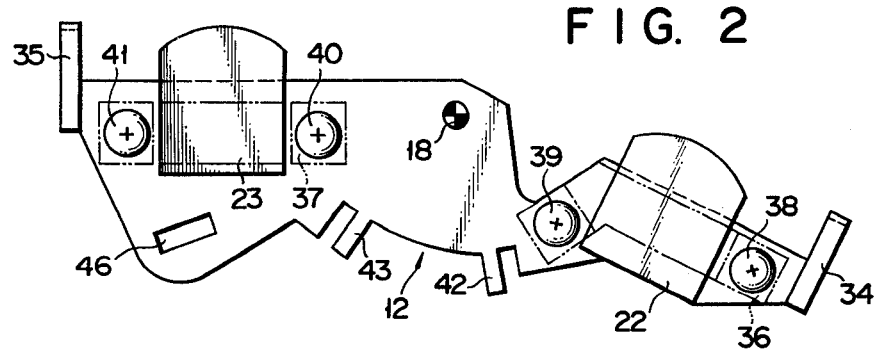

The head lever 12, as shown in FIG. 2, includes the magnetic heads 22 and 23 at both sides of the pin 18 which acts as the center of the pivotal movement, and tape guides 34 and 35 at the ends of the sides of the magnetic heads. In the embodiment, only one pair of magnetic heads 22 and 23 are disposed at the sides of the pin 18. However, two magnetic heads or more may be disposed at each side. The magnetic heads 22 and 23 are respectively supported on head mounting plates 36 and 37 which are mounted by pairs of screws 38, 39, and 40, 42, respectively, on the head lever 12. The screws 39 and 40 act as abutment members and sufficiently extend to come in contact with the pinch roller lever 14 which is located above the head lever 12. Projecting segments 42 and 43 which define the pivotal position of the head lever 12 are formed at a lower edge of the head lever 12, and a guide groove 46 is formed in the head lever 12.

Figure 3:
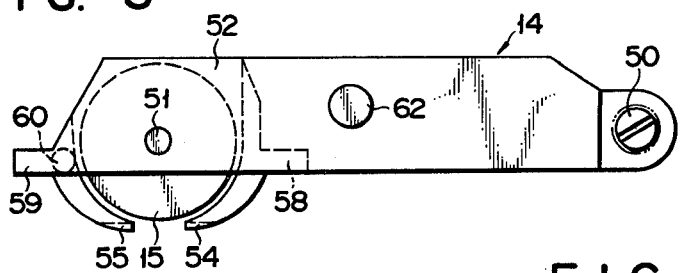
Figure 4:
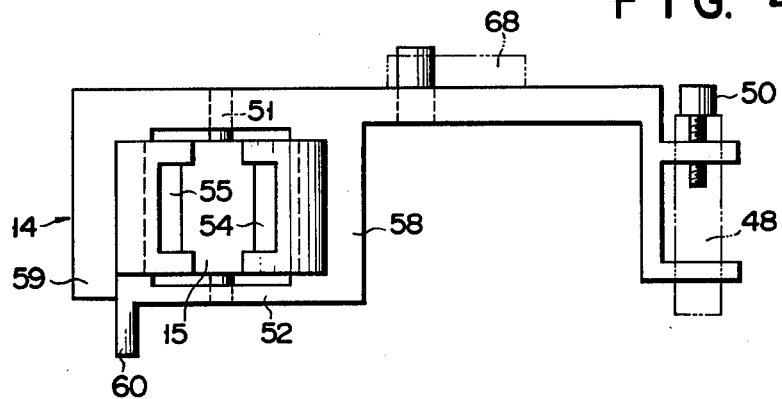

The pinch roller lever 14, as seen from FIGS. 3 and 4, is pivotally mounted to the upright post 48 (FIG. 1) by a screw 50 on the base plate 20. A pinch roller shaft 51 of the pinch roller 15 is mounted to a pinch roller support 52 so as to be free to rotate. A pair of tape guides 54 and 55 are mounted to the pinch roller support 52. In this manner, since the tape guides 54 and 55 are disposed on the pinch roller lever 14 and adjacent to the pinch roller 15, correct tape running is guaranteed. The pinch roller support 52 includes stoppers 58 and 59 which can come in contact with the screws 39 and 40 of the head lever 12. Further, a projecting member, such as a pin 60 extends downwardly from the pinch roller support 52, and a pin 62 extends upwardly on the pinch roller lever 14.

Figure 5:
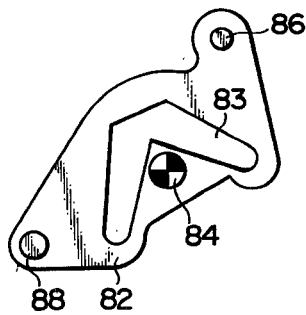
Figure 6:
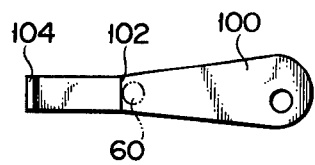

Referring to FIG. 1, a bent segment 64, one end of which extends downward at the top of the plunger 30, is fixed by a screw. A pin 66 is mounted at a horizontal portion 65 of the bent segment 64. One end of a connecting plate 68 is pivotally mounted to the pin 62 of the pinch roller lever 14, and the pin 66 of the plunger 30 is received in a guide groove 70 which is formed at the other end of the connecting plate 68. Therefore, the plunger 30 and the pinch roller lever 14 are connected by the connecting plate 68. The lower end of the bent segment 64 is connected to a rhombic segment 72, and a tension spring 76 is stretched between the rhombic segment 72 and a pin 74 which extends downward into the base plate 20. Thus, the plunger 30 is biased in the direction of a cassette holder 28. A guide pin 80 extends upward at the rhombic segment 72 and extends within a heart-shaped guide groove 83 which is formed on an operation plate 82 (see FIG. 5). The operation plate 82 is pivotally mounted by a rotation pin 84 to the base plate 20, and the rotation pin 84 and the pin 74 are aligned along the axis of the plunger 30. Pins 86 and 88 are arranged on both sides of the operation plate 82. The pin 86 which is situated within the guide groove 46 of the head lever 12 connects the operation plate 82 and the head lever 12. A torsion spring 92 is stretched between the pin 88 and a pin 90 on the base plate 20. The torsion spring 92 and the operation plate 82 constitute a bias mechanism 93. The bias mechanism 93 selectively biases the head lever 12 at the center of the pivotal movement, that is, the center of the pin 18, in the clockwise direction or in the counterclockwise direction.

FIG. 1 also shows a capstan shaft 94, and a stopper 96 which defines the pivotal position of the head lever 12 and the pinch roller lever 14. A restraining means, such as a leaf spring 100, is mounted on the base plate 20 by an eccentric screw 98. The leaf spring 100 includes a shoulder 102 which engages with the pin 60 of the pinch roller lever 14, and an upright bent segment 104 which extends upright on the base plate 20 and which elastically deforms the leaf spring 100 when the upright bent segment 104 is pressed by the cassette holder 28 or a tape cassette within the cassette holder 28. The upright bent segment 104 is disposed within the path in which the cassette holder 28 moves from an initial position, at which the tape may be inserted, to the position for the play mode.

FIG. 1 shows the head selection mechanism which uses the head 22 in the play mode (to be referred to as forward play), in which a magnetic tape 106 with the cassette holder 28 runs in the direction indicated by an arrow. The tape end is detected when the tape reaches the end, by a proper tape end detecting mechanism. The solenoid 16 is excited to retract the plunger 30 in the direction indicated by an arrow. When the plunger 30 is retracted into the solenoid 16, the pin 66 moves within the guide groove 70 and comes in contact with the end face of the guide groove 70, so that the connecting plate 68 is pulled in the direction away from the cassette holder 28. Therefore, the pinch roller lever 14 pivots about the upright post 48 in the clockwise direction against the biasing force of the torsion spring 24, and the pinch roller 15 is spaced apart from the tape 106. The pinch roller 14 pivots until it comes in contact with the stopper 96. When the solenoid 16 is not excited, the pinch roller lever 14 pivots about the upright shaft 48 in the counterclockwise direction by the biasing force of the torsion spring 24. The pinch roller lever 14 returns to a position where the pinch roller 15 is in contact with the tape 106, and the tape 106 is clamped between the pinch roller 15 and the capstan shaft 94. On the other hand, when the plunger 30 moves inside the solenoid 16, the rhombic segment 72 connected to the plunger 30 moves integrally with the plunger 30 against the biasing force of the torsion spring 76 through the bent segment 64. The pin 80 on the rhombic segment 72 moves within a left groove 85 of the guide groove 83, and the pin 80 comes in contact with the end face of the groove 85. Therefore, the operation plate 82 pivots about the pivotal pin 84 in the counterclockwise direction against the biasing force of the torsion spring 92. When the pin 88 moves over a neutral line 108 of the torsion spring 92, the torsion spring 92 operates to pivot the operation plate 82 about the pivotal pin 84 in the counterclockwise direction. Until the pin 88 passes the neutral line 108, the operation plate 82 gradually pivots in response to the movement of the plunger 30. When the pin 88 passes the neutral line 108, the operation plate 82 simultaneously pivots in the counterclockwise direction by the biasing force of the torsion spring 92.

Figure 9:
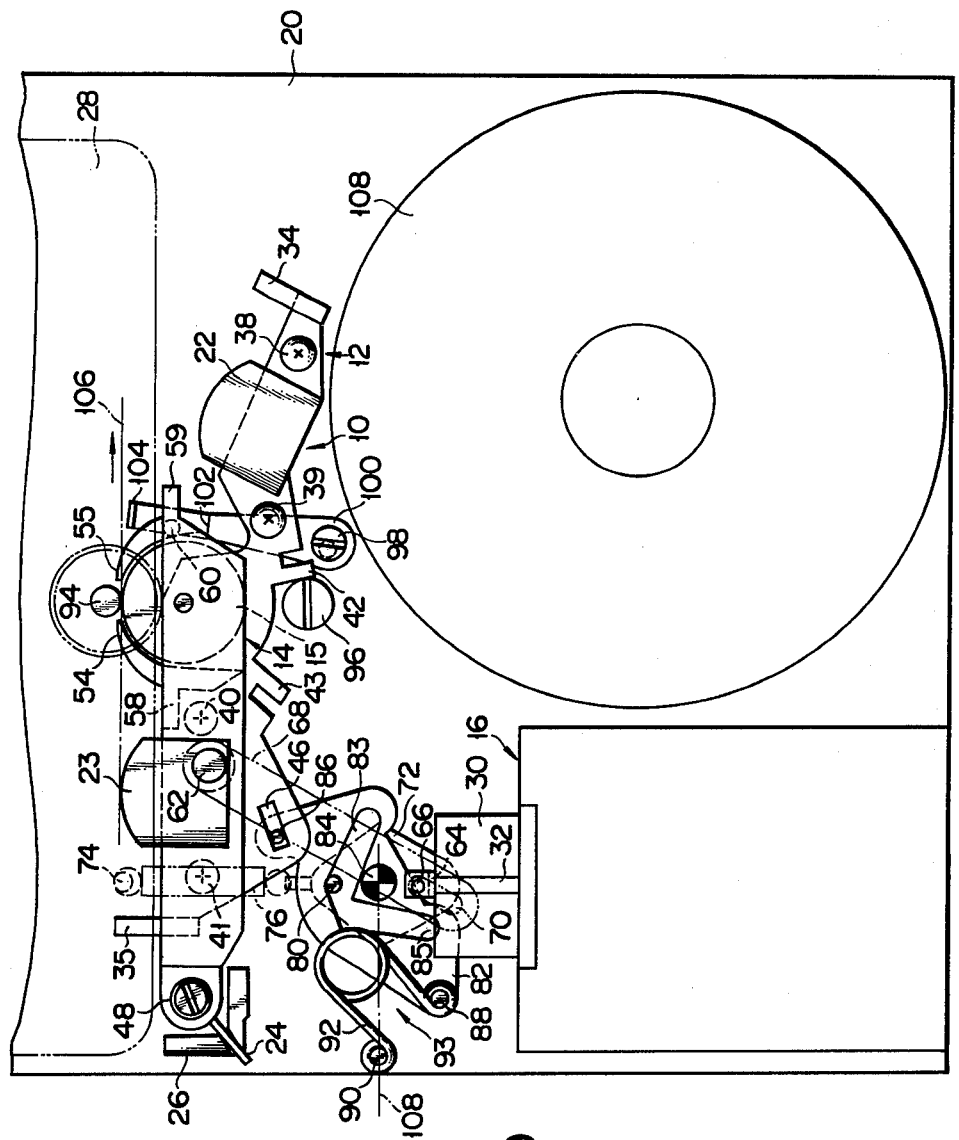
FIG. 9 is a schematic plan view of the head setting mechanism in the reverse play mode.

When the operation plate 82 pivots about the pivotal pin 84 in the counterclockwise direction, the pin 86 moves within the guide groove 46 to pivot the head lever 12 about the pin 18 in the clockwise direction. The head lever 12 pivots until the projecting segment 42 comes in contact with the stopper 96. Therefore, a play mode in which the head 23 comes in contact with the tape 106 is set (to be referred to as reverse play hereinafter). The head setting mechanism in the reverse play mode is shown in FIG. 9. When the solenoid 16 is not excited, the plunger 30, of course, returns to the projecting position by the biasing force of the tension spring 76. The head setting from the reverse play as shown in FIG. 9 to the forward play as shown in FIG. 1 is the same as in the operation as described above. Unless the cassette eject operation is performed, the forward play and the reverse play are alternatively set as described above.

Figure 7:
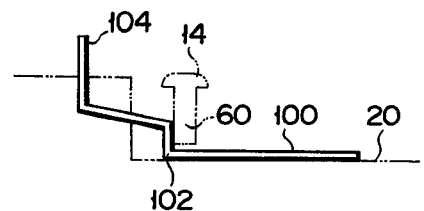
Figure 10:
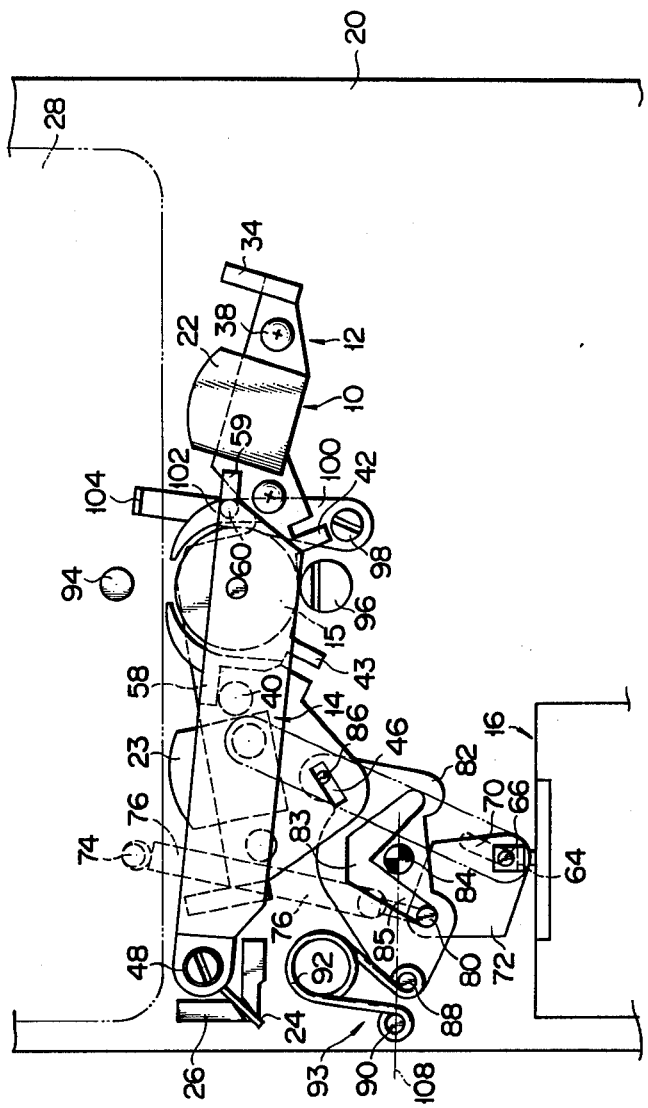

The cassette ejection is performed when the pinch roller 15 and the magnetic heads 22 and 23 are withdrawn to a position which does not prevent the ejection, that is, to the neutral position. For example, referring to FIG. 1, assume that the solenoid 16 is excited for cassette ejection. The plunger 30 moves inside the solenoid 16 and the pinch roller lever 14 connected to the plunger 30 by the connecting plate 68 pivots in the clockwise direction until the pinch roller lever 14 comes in contact with the stopper 96. Therefore, the pinch roller 15 is sufficiently spaced apart from the tape 106. Along with the retraction of the plunger 30 into the solenoid 16, the head lever 12 pivots in the clockwise direction so that the head 22 is sufficiently spaced apart from the tape 106. When the solenoid 16 is excited and the pinch roller 15 and the head 22 are sufficiently spaced apart from the tape 106 to a position where the pinch roller 15 and the head 22 do not prevent cassette ejection, the cassette holder 28 returns to the initial position, for example, the cassette holder 28 rises to the initial position in the inverted Staar system, and the tape cassette within the cassette holder 28 is ejected. When the tape cassette with the cassette holder 28 rises, the leaf spring 100 is restored to its original shape as shown in FIG. 7. When the solenoid 16 is deenergized after the cassette ejection, the pinch roller lever 14 pivots about the upright post 48 in the counterclockwise direction by the biasing force of the torsion spring 24. However, since the tape cassette is removed from the upright bent segment 104 and the leaf spring 100 is restored to its original shape, the pin 60 of the pinch roller lever 14 comes in contact with the shoulder 102 of the leaf spring 100, preventing the pivotal movement of the pinch roller lever 14. The pinch roller lever 14 is kept in the neutral position so that the pinch roller 15 does not prevent the descending operation of the cassette holder 28 (see FIGS. 7 and 10). When the pinch roller lever 14 moves to the neutral position, the head lever 12 is about to pivot in the clockwise direction in response to the pivotal movement of the operation plate 82 in the counterclockwise direction. When the screw 40 comes in contact with the stopper 58 of the pinch roller lever 14, the head lever 12 stops pivoting. The neutral position as shown in FIG. 10 in which the head 23 is not in contact with the magnetic tape 106, is set. In this neutral position, since the pin 88 of the operation plate 82 passes the neutral line, the torsion spring 92 acts to pivot the operation plate 82 in the counterclockwise direction and the head lever 12 in the clockwise direction, respectively.

In the condition in which the head lever 12 and the pinch roller lever 14 are located in the neutral position, the tape cassette is inserted into the cassette holder 28. When the tape cassette is inserted in the cassette holder 28, the cassette holder 28 descends, and the tape cassette within the cassette holder 28 comes in contact with the upright bent segment 104 of the leaf spring 100 to elastically deform the leaf spring downward. When the leaf spring 100 is deformed downward, the shoulder 102 disengages the pin 60 of the pinch roller lever 14. The pinch roller lever 14 pivots in the counterclockwise direction by the biasing force of the torsion spring 24, and the tape 106 is clamped between the pinch roller 15 and the capstan shaft 94. In response to the pivotal movement of the pinch roller lever 14, the head lever 12 pivots in the clockwise direction to a position where the head 23 comes in contact with the tape 106 by the biasing force of the torsion spring 92. Thus, the reverse play mode as shown in FIG. 9 is set.

Cassette ejection in the reverse play mode is performed in the same manner as in the operation described above. The neutral position from the reverse play mode to the forward play mode is shown in FIG. 11.

Figure 8:
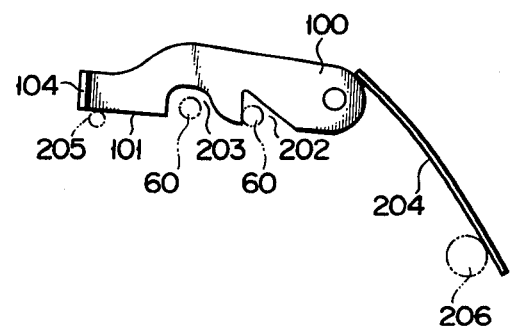

The leaf spring 100 operates so that the head lever 12 and the pinch roller lever 14 are maintained in the neutral position before the tape cassette is inserted in the cassette holder 28, and are released after the tape cassette is inserted in the cassette holder 28. The leaf spring 100 need not be arranged in such a manner that the shoulder 102 comes in contact with the pin 60. Instead, the leaf spring 100 may be arranged so that the pin 60 may be stopped at a notch 202, as shown in FIG. 8. In the modification as shown in FIG. 8, the pin 60 loosely fits within a notch 203 and the leaf spring 100 does not bias the pin 60. In this manner, in the play mode, with the arrangement in which the leaf spring 100 does not bias the pinch roller lever 14, the pinch roller 15 is pressed against the capstan shaft 94 at a constant biasing force, assuring stable tape running. An upright bent segment 204 is formed on the leaf spring 100; and stoppers 205 and 206 are formed on the base plate 20. The FF.REW modes are set by maintaining the condition in which the plunger 30 retracts into the solenoid 16, with touch switches for the forward play or the reverse play.

As described above, according to a method for setting any one of the heads of a cassette tape recorder of the present invention, the head lever and the pinch roller lever are biased in the direction of tape travel and at the same time the pivotal movement thereof is interrupted by a stopper. When a cassette tape is inserted in the cassette holder, the tape cassette or the cassette holder presses the stopper downward to remove it from the path of pivotal movement of the head lever and the pinch roller lever. According to this method, when the tape cassette is inserted in the cassette holder, and the cassette holder moves to a position in which the reproduction mode is set, the head lever and the pinch roller lever automatically pivot in the direction of the tape, thus accomplishing quick recording and reproduction operations.

The head setting mechanism for practicing the method according to the present invention as described above, comprises a pinch roller lever and a head lever which are respectively mounted on a base plate and which are biased in the direction of a capstan shaft on the base plate; and a cassette holder which is free to move between a first position in which a cassette tape is inserted and a second position in which the reproduction mode is set.

The head setting mechanism further comprises a stop means which includes a stop member disposed on the base plate, the stop member including a first portion which is located in the path of movement of the pinch roller lever and the head lever, and a second portion which is located in the path of movement of the cassette holder. The first portion comes in contact with at least one of the pinch roller lever and the head lever to interrupt the movement thereof in the direction toward the capstan shaft. The second portion is pressed by the cassette holder or the tape cassette within the cassette holder to remove the first portion from the path of movement of the pinch roller lever and the head lever, when the cassette holder moves from the first position to the second position. With the head setting mechanism of the above arrangement, the method for setting any one of the heads is practiced with certainty. Furthermore, according to the present head setting mechanism, a reduction gear mechanism, cams or the like are not required as opposed to a mechanism which uses a motor; thus a simple structure is accomplished. Since desired recording and reproduction may be achieved quickly according to the method of the present invention, great effects are obtained if the method of the present invention is applied to a car stereo unit. However, the present invention is not limited to the car stereo unit.

What is claimed is:

1. A head setting mechanism for a cassette tape recorder which includes a base plate, a capstan shaft rotatably mounted on the base plate, a head lever moveably arranged on the base plate, a pinch roller lever movably arranged on the base plate, at least one magnetic head mounted on the head lever, and a pinch roller rotatably supported by the pinch roller lever, said mechanism comprising:

biasing means for biasing the head lever and the pinch roller lever, respectively, each toward a position where the magnetic head and the pinch roller can be in contact with a magnetic tape of a tape cassette;

a cassette holder arranged to move freely between p first position at which the tape cassette can be inserted into the holder, and a second position at which a selected one of a recording mode and a reproducing mode can be set; and stop means for retaining the head lever and the pinch roller lever, respectively, each at a position at which the magnetic head and the pinch roller are spaced apart from the magnetic tape, the stop means including a stop member which is disposed on the base plate and which has a first portion located in the path of movement of the head lever and the pinch roller lever, and a second portion located in the path of movement of the cassette holder, the first portion being engaged with at least one of the head lever and the pinch roller lever to interrupt the movement of the head lever and the pinch roller lever toward the magnetic tape, and the second portion being arranged to be pressed by one of the cassette holder and the tape cassette within the holder, wherein the first portion of the stop member is moved away from the path of movement of the head lever and the pinch roller lever when the cassette holder moves from the first position toward the second position.

2. A mechanism according to claim 1, wherein said stop means includes a projecting member extending from the pinch roller and adapted to be engaged with the first portion of the stop member, and the stop member is made of a flexible elastic material.

3. A mechanism according to claim 2, wherein said stop member is a leaf spring which is fixed to the base plate at one end of the leaf spring, a central portion of the leaf spring is bent to form a shoulder to provide said first portion of the stop member, and the other end of the leaf spring is in the form of an upright bent segment to provide the second portion of the stop member.

4. A mechanism according to claim 2, wherein said stop member is a leaf spring which is fixed to the base plate at one end of the leaf spring, an edge of the leaf spring forms a notch to provide the first portion of the stop member, and the other end of the leaf spring is in the form of an upright bent segment to provide the second portion of the stop member.

5. A mechanism according to any one of claims 2, 3 or 4, wherein said head setting mechanism includes abutment means for interrupting the movement of said head lever toward the magnetic tape wherein said head lever is brought in contact with said pinch roller lever, said abutment means including a pair of stoppers which extend downward from said pinch roller lever in the region of the pinch roller, and a pair of abutment members which are mounted to said head lever and arranged to contact with corresponding ones of the stoppers extending from said pinch roller lever for interrupting the movement of said head lever toward the magnetic tape.

6. A mechanism according to claim 5, wherein said abutment members of said abutment means include two screws among a plurality of screws for mounting corresponding head mounting plates on said head lever.

7. A method for setting a magnetic head of a cassette tape recorder, comprising the steps of:

supporting the magnetic head on a head lever;

supporting a pinch roller on a pinch roller lever;

arranging the head lever and the pinch roller lever each for relative movement with respect to a magnetic tape;

biasing the head lever and the pinch roller lever each to a first position, respectively, whereat the magnetic head on the head lever and the pinch roller supported by the pinch roller lever can be in contact with the magnetic tape;

retaining the head lever and the pinch roller lever each at a second position, respectively, at which the magnetic head and the pinch roller are spaced apart from the magnetic tape, by interrupting the movement of the head lever and the pinch roller lever toward the first position; and releasing the interruption of said movement by loading a tape cassette in a position at which the magnetic tape in the tape cassette can be operatively driven relative to the magnetic head and the pinch roller, thereby moving the magnetic head and the pinch roller to the first position to contact the magnetic tape.

* * * * *

UNITED STATES PATENT AND TRADEMARK OFFICE
CERTIFICATE OF CORRECTION

PATENT NO. : 4,460,932
DATED : July 17, 1984
INVENTOR(S) : Akira OSANAI

It is certified that error appears in the above-identified patent and that said Letters Patent is hereby corrected as shown below:

In the Abstract, line 5, after "roller lever by" insert --a--;

Column 1, line 22, after "been proposed" insert --,--;

Column 7 (claim 1), line 10, after "freely between" change "p" to --a--.

Signed and Sealed this

Twenty-sixth Day of February 1985

[SEAL]

Attest:

DONALD J. QUIGG

Attesting Officer    Acting Commissioner of Patents and Trademarks